United States Patent [19]

Dezelan

[11] 4,341,280
[45] Jul. 27, 1982

[54] VARIABLE DISPLACEMENT FRONT WHEEL DRIVE SYSTEM

[75] Inventor: Joseph E. Dezelan, Western Springs, Ill.

[73] Assignee: Caterpillar Tractor Co., Peoria, Ill.

[21] Appl. No.: 149,354

[22] PCT Filed: Feb. 4, 1980

[86] PCT No.: PCT/US80/00121

§ 371 Date: Feb. 4, 1980

§ 102(e) Date: Feb. 4, 1980

[51] Int. Cl.³ ............................................. B60K 25/00
[52] U.S. Cl. ...................................... 180/243; 60/422;
180/306; 180/307
[58] Field of Search ............... 180/242, 243, 306, 307,
180/305; 60/422

[56] References Cited
U.S. PATENT DOCUMENTS

| | | | |
|---|---|---|---|
| 3,053,043 | 9/1962 | Knowler | 180/243 |
| 3,339,660 | 9/1967 | Budzich | 180/243 |
| 3,354,978 | 11/1967 | Budzich | 180/243 |
| 3,780,819 | 12/1973 | Coordes | 180/243 |
| 3,984,978 | 10/1976 | Alderson | 180/242 |
| 3,997,017 | 12/1976 | Campbell | 180/243 |
| 4,069,886 | 1/1978 | Campbell et al. | 180/44 |
| 4,077,484 | 3/1978 | Dezelan | 180/242 |

Primary Examiner—Joseph F. Peters, Jr.
Assistant Examiner—Donn McGiehan
Attorney, Agent, or Firm—Sixeby, Friedman & Leedom

[57] ABSTRACT

A variable displacement auxiliary front wheel drive system (10) is provided which includes a variable displacement fluid motor (12, 14, 16) for driving at least one vehicle wheel. The fluid motor (12, 14, 16) receives fluid under pressure from a supply source (30, 32) connected to a variable displacement pressure compensated pump which supplies fluid to a hydraulic system for the vehicle accessories. To render the variable displacement fluid motor (12, 14, 16) inoperative, a fluid control system (34, 36, 40) may be selectively operated to block fluid flow from the supply source (30, 32) to the variable displacement fluid motor (12, 14, 16) and to a pressure compensating system (44) for the fluid motor (12, 14, 16). With fluid from the supply source (30, 32) blocked, a plurality of spool valves (46, 48, 50) in the pressure compensating system (44) are drained. When the fluid control system (34, 36, 40) is activated to again permit fluid to flow from the supply source (30, 32), a delay unit insures that fluid reaches a fluid clutch (96) before the variable displacement fluid motor (12, 14, 16) is activated.

10 Claims, 3 Drawing Figures

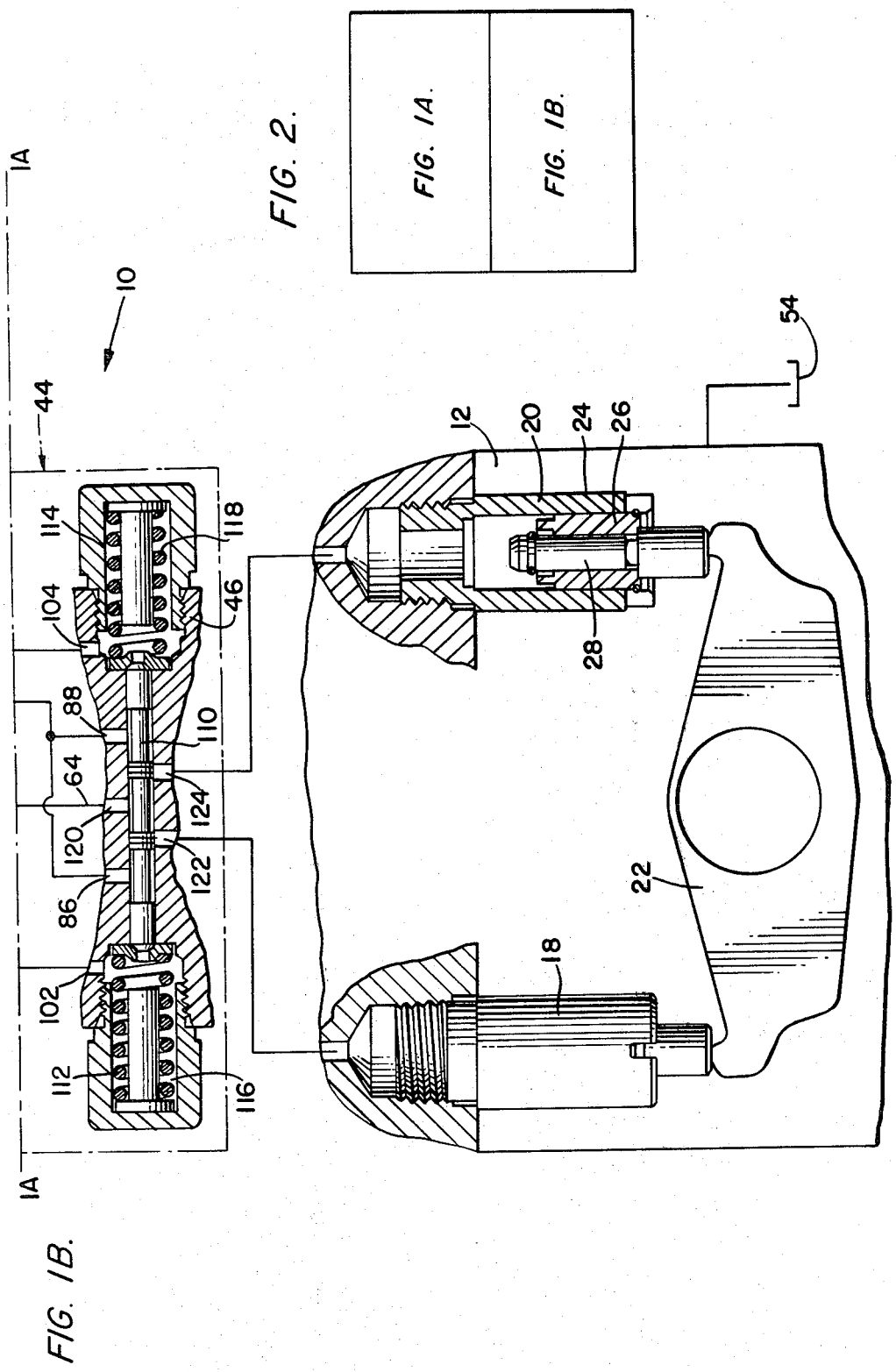

VARIABLE DISPLACEMENT FRONT WHEEL DRIVE SYSTEM

TECHNICAL FIELD

This invention relates to an auxiliary hydraulic front wheel drive system for a vehicle which utilizes the pressure compensated pump in the accessory hydraulic system of the vehicle. The system includes a pair of variable displacement axial piston motors with one motor being connected to each front wheel of the vehicle by a clutch unit. The motors are driven by the pump for the accessory hydraulic system and are pressure and flow compensated.

BACKGROUND ART

Many vehicles which require four-wheel traction have been provided with an auxiliary hydraulic front wheel drive which works in conjunction with a conventional mechanical transmission providing the primary drive for the vehicle. Systems of this type have been particularly useful for earth moving equipment, tractors, self propelled farm machinery and other self propelled vehicles which normally include a hydraulic system for powering various vehicle accessories. U.S. Pat. Nos. 3,339,660 and 3,354,978 to Tadeusz Budzich disclose front axle fluid power drive systems employing fluid motors which are supplied by a variable displacement pump. These systems are controlled by an automatic pressure responsive control which varies the pump displacement to maintain a constant system pressure and a constant torque at the fluid motors.

Initially, most auxiliary hydraulic drive systems utilized a separate fluid pump and were totally independent of the hydraulic system employed to power vehicle accessories such as steering, brakes, earth moving blades and the like. However, auxiliary drive systems have been developed which use the pump source for the vehicle accessories rather than a separate and independent pump. Such a system is illustrated by U.S. Pat. No. 3,984,978 to Loren L. Alderson which discloses the use of a pair of variable displacement axial piston motors, each directly connected to the front wheel of a vehicle. The motors are pressure compensated at a level slightly below the pressure compensating level of the primary system pump for the accessories system, and a flow compensating control is provided to cause the motor swash plate to destroke and maintain a constant flow rate if the flow level through the motors exceeds a predetermined rate.

Often it is desirable to selectively connect the motors of the auxiliary front wheel drive system to the driven wheels by means of hydraulically activated clutches. In such cases, pressurized fluid supplied to each motor actuates a clutch associated with that motor so that the motor is drivingly engaged with the wheel. A system of this type is disclosed in U.S. Pat. No. 4,069,886 to John J. Campbell et al.

In the auxiliary hydraulic front wheel drive systems of the prior art, pilot operated spool valves are normally used in the pressure and flow control system for the front wheel variable displacement drive motors. These valves are continuously subjected to fluid pressure, even when the associated variable displacement motor is inoperative. With the motor inoperative, the fluid pressure applied to the stems of the spool valves in the control system is likely to cause foreign matter and slit to build up in the spool valves resulting in subsequent valve sticking.

DISCLOSURE OF THE INVENTION

The present invention is directed to a variable displacement front wheel drive system for a vehicle wherein a variable displacement fluid motor is provided to drive an associated wheel. A control system for the motor receives fluid pressure from a pressure source and provides directional control while causing the motor to be pressure and flow compensated. Fluid pressure is blocked from the control system when the variable displacement motor is inoperative.

The present invention further provides a novel variable displacement front wheel drive system for a vehicle including a fluid control system for a variable displacement fluid motor which drives an associated wheel. This control system includes a plurality of spool valves which receive fluid pressure from a fluid pressure source when the motor is operative, and means are provided to block fluid from the source when the motor is inoperative. When fluid from the fluid pressure source is blocked, the spool valves are vented to tank to remove fluid pressure from these valves.

In one aspect of the present invention, a variation displacement front wheel drive system is provided having a control system for a variable displacement fluid motor which receives fluid pressure from a pump employed to drive vehicle accessories. The control system incorporates spool valves which include a pressure compensator valve, a flow control valve and a direction valve which receive fluid pressure when said motor is operative. When the motor is inoperative, the directional valve and flow control valve are vented to tank along with the end chambers of the pressure compensator valve.

The present invention further provides a novel variable displacement front wheel drive system for a vehicle wherein a variable displacement fluid motor is selectively connected to an associated wheel by a fluid clutch. The clutch is activated when fluid pressure is received from a fluid pressure source by a control system for the motor which provides directional, flow and pressure control. The control system initiates engagement of the clutch before motor operation is initiated thereby to prevent initial overspeeding of the motor.

Additional objects, advantages and features of the invention will be more readily apparent from the following detailed description of a preferred embodiment of the invention when taken together with the accompanying drawing.

BRIEF DESCRIPTION OF THE DRAWINGS

FIGS. 1A and 1B provide a schematic diagram of the variable displacement front wheel drive system of the present invention; and FIG. 2 discloses the relationship of FIGS. 1A and 1B.

BEST MODE FOR CARRYING OUT THE INVENTION

Figure 1A:
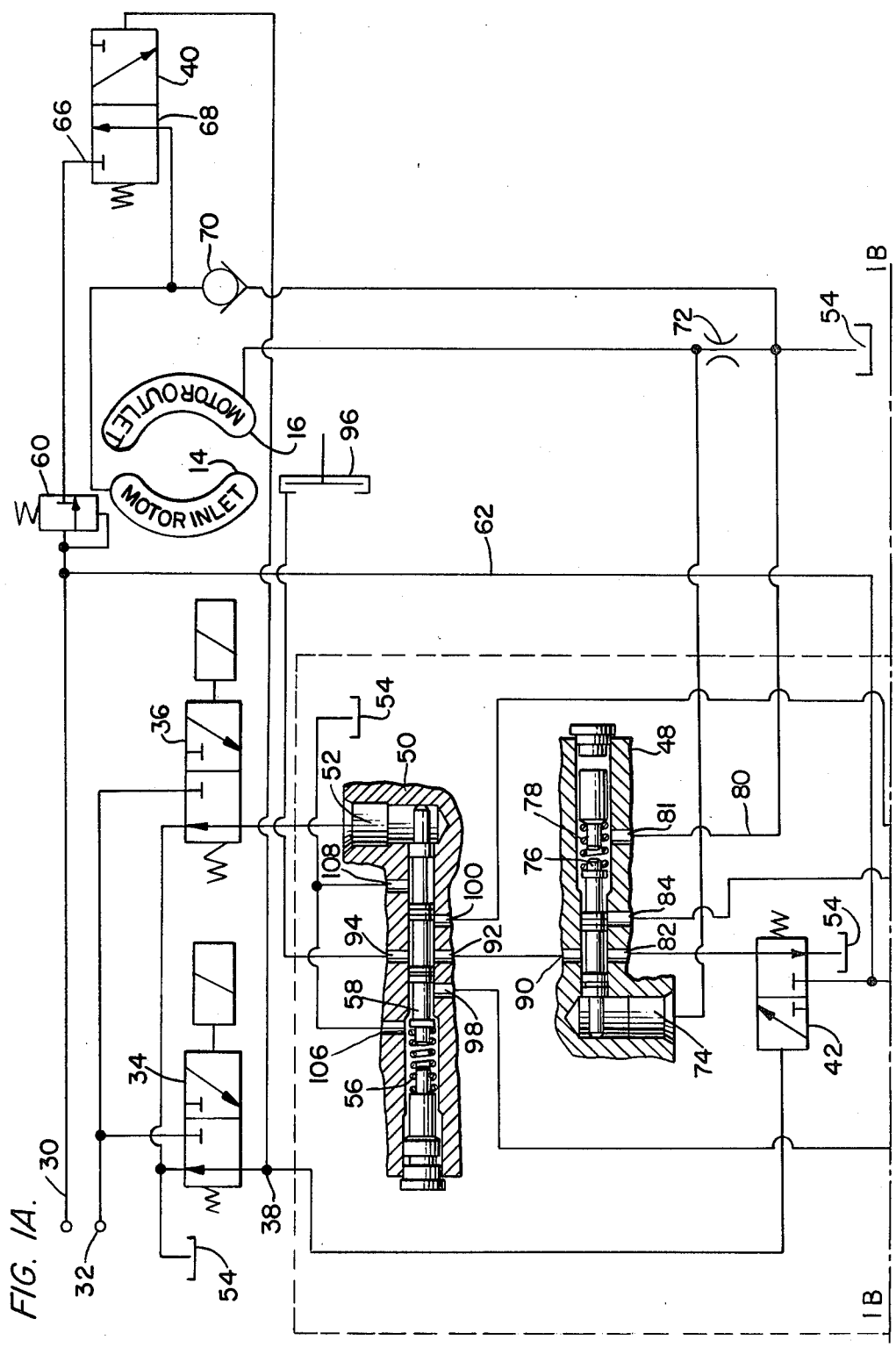

Referring now to the drawing, the variable displacement front wheel drive system of the present invention indicated generally at 10 includes a variable displacement, axial piston hydraulic motor 12 which may be connected to provide driving power to the front wheel of a vehicle such as a motor grader. A similar variable displacement motor with an identical control system is connected to control the remaining front wheel of the vehicle, and since the controls for each motor are the same, only the control system in combination with a single motor will be described herein.

The structural details of variable displacement motors or pumps of the type used for the motor 12 are well known, and the motor and control system therefor are similar to those shown in the Alderson Patent previously identified. This patent may be referred to for supplemental descriptive material relating to the control system and the motor 12, and consequently only the basic elements of the motor will be described herein.

The motor 12 is supplied with hydraulic pressure which passes through an inlet 14 and which exits through an outlet 16. The motor includes a pair of control cylinders 18 and 20 having pistons which engage a swash plate 22. The swash plate is pivotally mounted for movement in ether direction from a neutral dead center position where the wheel associated with the motor 12 is in effect decoupled from the front wheel hydraulic drive system.

Each of the cylinders 18 and 20 are of a known construction and include a cylinder sleeve 24 which slidably receives a two-stage telescoping piston consisting of a first stage 26 and a second stage 28. The cylinders 18 and 20 operate in conjunction with the swash plate 22 to adjust the displacement of the motor 12 to control the front wheel drive. The angle of tilt of the swash plate determines the amount of stroke or displacement of the two stage pistons.

The hydraulic drive system 10 is provided with pump pressure from a variable displacement pump, not shown, at an inlet 30, while reduced pilot pressure from a vehicle hydraulic system, such as a steering circuit, is provided to the system at an inlet 32. This pilot pressure is provided to a solenoid operated on/off valve 34 and a solenoid operated forward/reverse valve 36. In the deenergized or "off" state, the on/off valve 34 blocks the passage of pilot pressure, while in the "on" state, the on/off valve provides pilot pressure at an outlet 38. From the outlet 38, the pilot circuit splits to provide pilot pressure to a pilot operated valve 40 which controls the main pump pressure flow from the inlet 30 and also to a pilot operated clutch valve 42. This clutch valve constitutes a portion of a pressure compensating control unit 44 which includes a pressure compensator valve 46, a flow control vale 48, and a direction valve 50. The pressure compensator valve, flow control valve, and direction valve constitute spool valves which correspond respectively to the pressure control spool, flow control spool, and forward/reverse spool shown in FIG. 1 of the Alderson patent.

The solenoid operated forward/reverse valve 36 operates in the deenergized or "forward position" shown in the drawing to vent a pilot inlet port 52 for the direction valve 50 to tank 54. With no pressure at the pilot inlet port 52, a spirng 56 maintains a valve spool 58 for the direction valve in the far right position as shown in the drawing. When the forward/reverse valve 36 is energized to conduct pilot pressure to the pilot inlet 52, the valve spool 58 shifts to the left against the bias of the spring 56.

The main pump pressure flow from the inlet 30 is conveyed by a pilot controlled sequence valve 60 to the pilot operated valve 40. This pressure flow is also provided directly, by means of a line 62, to the pilot operated clutch valve 42 and to a line 64 leading to the pressure compensator valve 46.

The pilot operated valve 40 selectively provides main pump pressure from an inlet port 66 to an outlet port 68 and then to a check valve 70 and the motor inlet 14. Flow from the motor outlet 16 is connected by means of a restricted orifice 72 to tank 54.

The flow control valve 48 has a pilot inlet 74 which is connected between the motor outlet 16 and the restricted orifice 72. The right end of the flow control valve is connected to tank 54 by a drain line 80 connected to a valve port 81 so that the flow control valve senses the pressure drop across the orifice. The flow control valve includes a spool 76 which is biased to the left in the drawing by a spring 78.

An inlet port 82 for flow control valve 48 is selectively connected to tank 54 or to the pump pressure in line 62 by the pilot operated clutch valve 42. Also, a valve port 84 is connected in parallel to valve ports 86 and 88 of the pressure compensator valve 46, while an outlet port 90 is connected by means of an inlet port 92 and an outlet port 94 of the direction valve 50 to a clutch 96.

The direction valve 50 includes valve ports 98 and 100 respectively which are connected to inlet ports 102 and 104 leading to servo chambers at either end of the pressure compensator valve 46. The direction valve also includes valve ports 106 and 108 which are connected to tank 54.

The pressure compensator valve 46 includes a spool 110 which is biased to a "no-pressure" position as shown in the drawing by springs 112 and 114 positioned at either end thereof. The chambers 116 and 118 which hold the springs 112 and 114 also provide servo chambers which are selectively connected to either tank or pump pressure by means of inlet ports 102 and 104, depending upon the direction in which the motor 12 is being operated. An inlet port 120 provides pump pressure to the pressure compensator valve from the line 64, while valve outlet ports 122 and 124 respectively are connected to the motor control cylinders 18 and 20.

When the spool 110 is in the "no-pressure" position, pump pressure from the inlet port 120 is passed through outlet ports 122 and 124 to equally charge the cylinders 18 and 20.

The direction valve 50 is controlled by the solenoid operated forward/reverse valve 36. The forward/reverse valve operates to either connect the pilot inlet port 52 to tank 54 as shown in the drawing or to provide pilot pressure from the source 32 to the pilot inlet port. For forward motor operation, the pilot inlet port is vented to tank and the spool 58 is positioned to the far right in the drawing. With the spool 58 in this position, pressure fluid is provided from the inlet port 92 to the port 100 and then to the inlet port 104 for the pressure compensator valve 46. The opposite end of the pressure compensator valve is connected to tank 54 by means of compensator valve inlet port 102 and the inlet port 98 and outlet port 106 of the direction valve.

When the forward/reverse valve 36 is shifted to the "reverse position", the valve connects the pilot inlet port 52 of the direction valve 50 to the pilot pressure source at inlet 32. Spool 58 now moves to the left in the drawing against the bias of the spring 56, and the pressure compensator valve inlet port 104 is now connected to tank 54 through valve ports 100 and 108 of the direction valve. At the same time, pressure fluid from the inlet port 92 passes through the valve port 98 to the inlet port 102 of the pressure compensator valve. It therefore becomes apparent that the direction valve 50 operates under the control of the forward/reverse valve 36 to selectively permit pump pressure to be directed to the servo chamber in one end of the pressure compensator valve 46 while simultaneously venting the servo chamber at the opposite end to tank.

When the servo chamber 118 is pressurized, pump pressure from the line 62 passes through inlet port 120 and outlet port 122 to maintain pressure in cylinder 18. At the same time, cylinder 20 is vented to tank 54 through outlet port 124 and inlet port 88 of the pressure compensator valve 46 and valve ports 84 and 81 of the flow control valve 48 to the line 80.

Conversely, when the servo chamber 116 is pressurized, pump pressure from the line 62 passes through the inlet port 120 and outlet port 124 to maintain pressure in cylinder 20. Now cylinder 18 is vented to tank 54 through outlet port 122 and inlet port 86 of the pressure compensator valve and valve ports 84 and 81 of the flow control valve.

Flow control valve 48 operates to sense the pressure drop across restricted orifice 72. When the discharge flow from the motor outlet 16 is excessive, the pressure at the pilot inlet port 74 of the flow control valve will overcome the combined force of the spring 78 and the pressure on the line 80, and will operate to shift the spool 76 to the right in the drawing. The flow path from valve port 84 to valve port 81 is blocked, and a flow path from valve port 84 to valve port 82 is now opened. Pressure from line 62 is provided through clutch valve 42, valve port 82 and valve port 84 to the valve port 88 or 86 which was previously connected to tank 54 through the flow control valve. Thus the cylinder 18 or 20 which was previously vented to tank is pressurized to some extent to counteract the pressure on the remaining cylinder and reduce the angle of the swash plate 22 to reduce flow through the motor 12.

INDUSTRIAL APPLICABILITY

An auxiliary front wheel drive system wherein the source 30 is directly connected to the pressure compensator valve 46, the flow control valve 48, and the direction valve 50 will result in the provision of fluid under pressure throughout the system regardless of whether the motor 12 is operative. This is not the case with the variable displacement front wheel drive system 10 where provision of the on/off valve 34 operates to block pilot fluid from the inlet 32 needed to pressurize the system.

With pilot fluid blocked by the on/off valve 34, pump pressure from the source 30 is blocked by the pilot operated valve 40 and by the pilot operated clutch valve 42. Pump pressure does pass through the inlet 120 of the pressure compensator valve 46, but since neither of the servo chambers 116 and 118 is pressurized, the pump pressure from inlet 120 passes equally through valve ports 122 and 124 to the cylinders 18 and 20. This causes the swash plate 22 to be balanced in the neutral center position for zero displacement.

The clutch 96 is drained to tank 54 through the clutch valve 42 by means of the valve ports 94 and 92 of the direction valve 50 and the valve ports 90 and 82 of the flow control valve 48. Similarly, the servo chamber 118 of the pressure compensator valve 46 is vented to tank through the valve ports 100 and 92 of the direction valve.

The servo chamber 116 of the pressure compensator valve 44 is vented to tank 54 through the inlet port 102 and the valve ports 98 and 106 of the direction valve 50.

Thus it may be observed that with the solenoid operated forward/reverse valve 36 in the forward, deenergized position and the on/off valve 34 deenergized, the clutch 96, the end chambers 116 and 118 of the pressure compensator valve 46 and the direction valve 50 are all vented to tank 54.

Similarly, pump flow to the flow control valve 48 is completely blocked, and this valve is drained to tank 54 through the pilot port 74 and orifice 72, the valve port 82 and clutch valve 42, and the valve port 81 and line 80. Only the stem 110 of the pressure compensator valve 46 is subjected to fluid pressure when the motor 12 is inoperative, and thus the possibility of silting and the faulty valve operation resulting therefrom is minimized within the variable displacement front wheel drive system 10.

To initiate operation of the variable displacement front wheel drive system 10 to drive the front wheels of a vehicles in the forward direction, the forward/reverse valve 36 is left in the deenergized "forward position" and the on/off solenoid valve 34 is energized. Outlet 38 will now be disconnected from tank 54 and connected through the on/off valve to the inlet 32. Pilot pressure will pass through the on/off valve to open the pilot operated valve 40 and to shift the pilot operated clutch valve 42. The clutch valve operates to disconnect inlet port 82 of the flow control valve 48 from tank 54 and to reconnect this inlet port to receive pump pressure from the line 62.

With the pilot circuit operating, pump pressure from the inlet 30 is conducted by means of line 62 through the clutch valve 42, the inlet port 82 and the outlet port 90 of the flow control valve 48, and the inlet and outlet ports 92 and 94 of the direction valve 50 to activate the clutch 96. This causes the clutch to engage and connect the motor 12 to drive a front wheel for the vehicle.

It is important to note that the sequence valve 60 prevents fluid from the inlet 30 from passing through the pilot operated valve 40 until the pressure has increased to engage clutch 96. This insures that the clutch will be engaged before the motor inlet 14 receives pump pressure to drive the motor 12, thereby preventing possible overspeeding of the motor and damage to the motor and clutch resulting from clutch engagement after the motor is started.

With the clutch 96 engaged, pump pressure passes through the pilot operated valve 40 to the motor inlet 14 and from the motor outlet 16 through the restricted orifice 72 to tank 54. Pump pressure also passes from the inlet port 92 of the direction control valve 50 through the valve port 100 to the inlet port 104 and servo chamber 118 of the pressure compensator valve 46. This causes the valve spool 110 of the pressure compensator valve to move against the bias of the spring 112. The springs 112 and 114, establish the minimum pressure for the system to insure adequate operation of priority accessory systems such as power steering. The servo chamber 116 is vented to tank 54 through valve port 102 and valve ports 98 and 106 of the direction control valve.

Once the valve spool 110 shifts to the left in the drawing, system pressure is conducted from line 64 and inlet port 120 through outlet port 122 to cylinder 18. Simultaneously cylinder 20 is vented to tank 54 through valve ports 124 and 88 of the pressure compensator valve, valve ports 84 and 81 of the flow control valve and line 80.

With the variable displacement drive system 10 now in operation in the forward mode, the flow control valve 48 operates to control fluid flow in accordance with the sensed pressure drop across the restricted orifice 72. If an excess flow condition occurs, the motor swash plate 22 is destroked. Similar destroking of the swash plate occurs if an insufficient pressure condition is sensed by the pressure compensator valve 46 so that priority flow is provided to the vehicle accessories. With the system in the forward mode, insufficient pressure will result in a decrease in pressure in the servo chamber 118 and the spring 112 will drive the spool 110 to the right in the drawing causing the swash plate 22 to destroke.

I claim:

1. In a vehicle having a primary hydraulic system including pump means to supply fluid to the vehicle accessories, a variable displacement auxiliary front wheel drive system (10) to drive at least one wheel of said vehicle, the improvement comprising: at least one variable displacement fluid motor means (12,14,16), fluid supply means (30,32) for supplying fluid under pressure to said fluid motor means (12,14,16), pressure compensating control means (44) operative to cause said fluid motor means (12,14,16) to destroke when the fluid pressure from said fluid supply means drops below a predetermined level, fluid control means (34,36,40) connected to selectively block fluid from said fluid supply means (30,32) to said pressure compensating control means (44) and said fluid motor means (12,14,16) to render said fluid motor means (12,14,16) inoperative, and drain means (42,50) operative to drain fluid from said pressure compensating control means (44) in response to the operation of said fluid control means (34,36,40) to block fluid from said fluid supply means (30,32).

2. The front wheel drive system (10) of claim 1, wherein said fluid motor means (12, 14, 16) includes a reversible axial piston motor having a fluid inlet port (14), a fluid outlet port (16), a pivotal swash plate (22) and fluid driven control cylinder means (18, 20) on opposite sides of said swash plate (22) to pivot said swash plate (22) relative to a neutral center position where the motor displacement is zero, said pressure compensating control means (44) operating when said variable displacement fluid motor means (12, 14, 16) is inoperative to provide fluid from said fluid supply means (30, 32) to said fluid driven control cylinder means (18, 20) to cause said fluid driven control cylinder means (18, 20) to maintain the swash plate (22) in said neutral center position.

3. The front wheel drive system (10) of claim 1, wherein said pressure compensating control means (44) includes a pressure compensator valve (46), a direction control valve (50) and a flow control valve (48) connected to control said fluid motor means (12,14,16), said drain means (42,50) operating to drain said pressure compensator valve (46), direction control valve (50) and flow control valve (48) when the fluid control means (34,36,40) operates to block fluid flow from said fluid supply means (30,32).

4. The front wheel drive system (10) of claim 1, which includes clutch means (96) engagable upon the application of fluid pressure thereto to effect a driving connection between the fluid motor means (12, 14, 16) and the wheel driven thereby, means (62, 42, 48, 50) for supplying fluid from said fluid supply menas to said clutch means (96), said fluid control means (34, 36, 40) being connected to selectively block fluid flow from said fluid supply means (30, 32) to said clutch means (96).

5. The front wheel drive system (10) of claim 4, wherein said fluid control means (34,36,40) is operative to initiate fluid flow from said fluid supply means (30,32) to said clutch means (96) and said fluid motor means (12,14,16) after said fluid flow has been blocked by said fluid control means (34,36,40), said front wheel drive system (10) including flow delay means (60) connected between said fluid supply means (30,32) and said fluid motor means (12,14,16), said flow delay means (60) operating to delay fluid flow to said fluid motor means (12,14,16) until fluid flow from said fluid supply means (30,32) has caused said clutch means (96) to engage.

6. In a vehicle having a primary hydraulic system including pump means to supply fluid to the vehicle accessories, a variable displacement auxiliary front wheel drive system (10) to drive at least one wheel of said vehicle, the improvement comprising: at least one variable displacement fluid motor means (12, 14, 16), fluid supply means (30, 32) for supplying fluid under pressure to said fluid motor means (12, 14, 16), pressure compensating control means (44) operative to cause said fluid motor means (12, 14, 16) to destroke when the fluid pressure from said fluid supply means drops below a predetermined level, said pressure compensating control means (44) including a pressure compensator valve (46) having first and second pilot fluid chambers (116, 118) at opposite ends thereof and spool valve means (110) movable between said pilot fluid chambers (116, 118) and responsive to fluid pressure in said pilot fluid chambers (116, 118) and direction valve means (50) connected to control the flow of fluid to said first and second pilot fluid chambers (116, 118), and fluid control means (34,36,40) connected to selectively block fluid from said fluid supply means (30, 32) to said pressure compensating control means (44) and said fluid motor means (12, 14, 16) to render said fluid motor means (12, 14, 16) inoperative, said direction valve means (50) operating to drain both said first and second pilot fluid chambers (116, 118) in response to the operation of said fluid control means (34, 36, 40) to block fluid from said fluid supply means (30,32).

7. The front wheel drive system (10) of claim 6, wherein drain valve means (42) are provided to drain said direction valve means when said fluid control means (34, 36, 40) operates to block fluid flow from said fluid supply means (30, 32).

8. The front wheel drive system (10) of claim 7, wherein said pressure compensating control means (44) includes flow control valve means (48) connected to sense the flow of fluid from said fluid motor means (12, 14, 16), said flow control valve means (48) being drained by said drain valve means (42) when the fluid control means (34, 36, 40) operates to block fluid flow from said fluid supply means (30, 32).

9. In a vehicle having a primary hydraulic system including pump means to supply fluid to the vehicle accessories, a variable displacement auxiliary front wheel drive system (10) to drive at least one wheel of said vehicle, the improvement comprising: at least one variable displacement fluid motor means (12,14,16), fluid supply means (30,32) for supplying fluid under pressure to said fluid motor means (12,14,16), pressure compensating control means (44) operative to cause said fluid motor means (12,14,16) to destroke when the fluid pressure from said fluid supply means drops below a predetermined level, fluid control means (34,36,40) connected to selectively block fluid from said fluid supply means (30,32) to said pressure compensating control means (44) and said fluid motor means (12,14,16) to render said fluid motor means (12,14,16) inoperative, clutch means (96) engageable upon the application of fluid pressure thereto to effect a driving connection between the fluid motor means (12,14,16) and the wheel driven thereby, means (62, 42, 48, 50) for supplying fluid from said fluid supply means to said clutch means (96), said fluid control means (34, 36,40) being connected to selectively block fluid flow from said fluid supply means (30,32) to said clutch means (96), and operative to initiate fluid flow from said fluid supply means (30,32) to said clutch means (96) and said fluid motor means (12,14,16) after said fluid flow has been blocked by said fluid control means (34,36,40), and flow delay means (60) connected between said fluid supply means (30,32) and said fluid motor means (12,14,16), said flow delay means (60) operating to delay fluid flow to said fluid motor means (12,14,16) until fluid flow from said fluid supply means (30,32) has caused said clutch means to engage.

10. The front wheel drive system (10) of claim 9, wherein said pressure compensating control means includes a pressure compensator valve (46), a direction control valve (50) and a flow control valve (48) connected to control said fluid motor means (12, 14, 16) and drain means (42, 80, 72, 106, 108) to drain said pressure compensator (46), direction control (50) and flow control (48) valves when the fluid control means (34, 36, 40) operates to block fluid flow from said fluid supply means (30, 32).

* * * * *